Aug. 11, 1964  Z. TAKATS  3,143,944
ULTRA-RAPID PROCESSING CAMERA
Filed Feb. 3, 1961  5 Sheets-Sheet 1
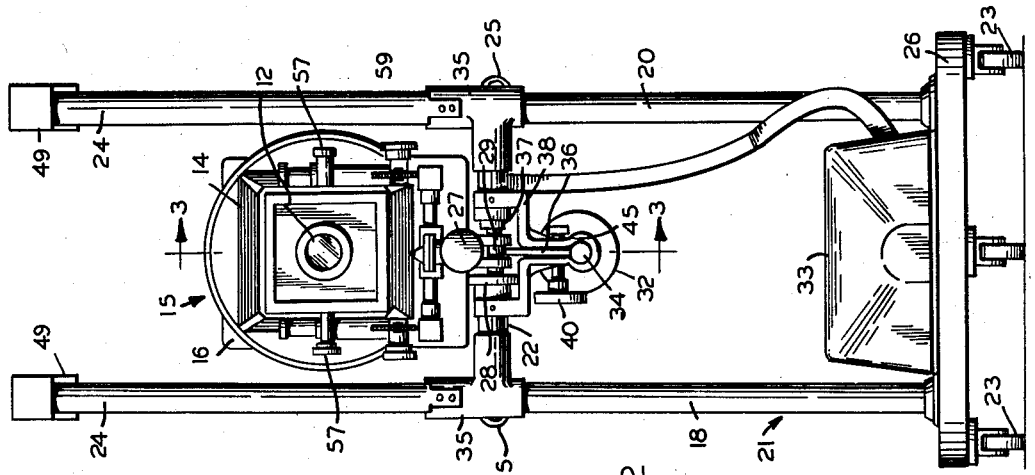
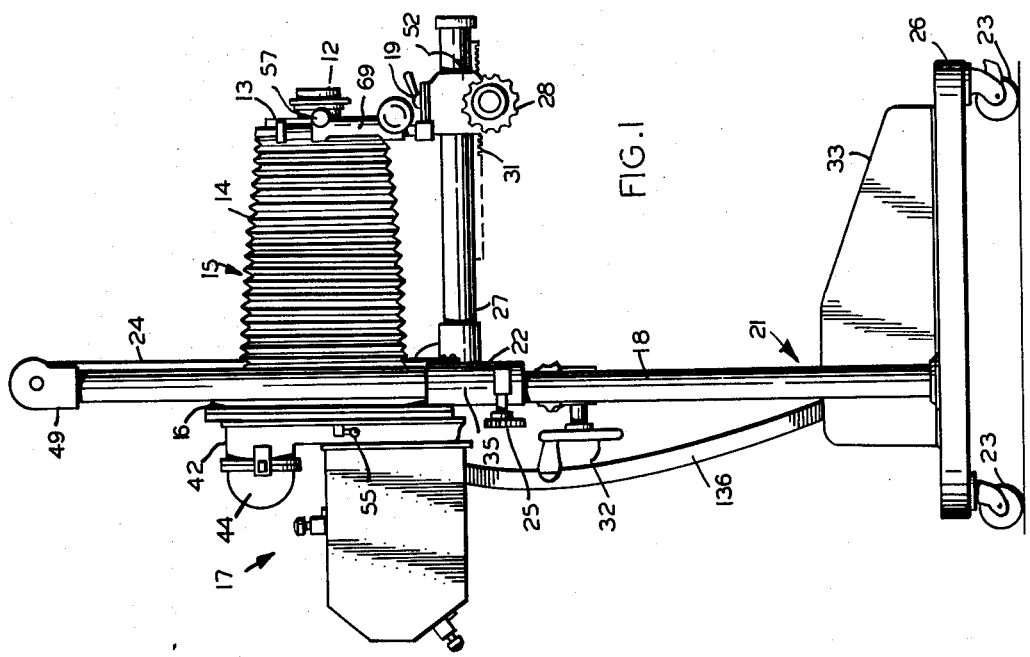
INVENTOR.
ZOLTAN TAKATS
BY
ATTORNEYS

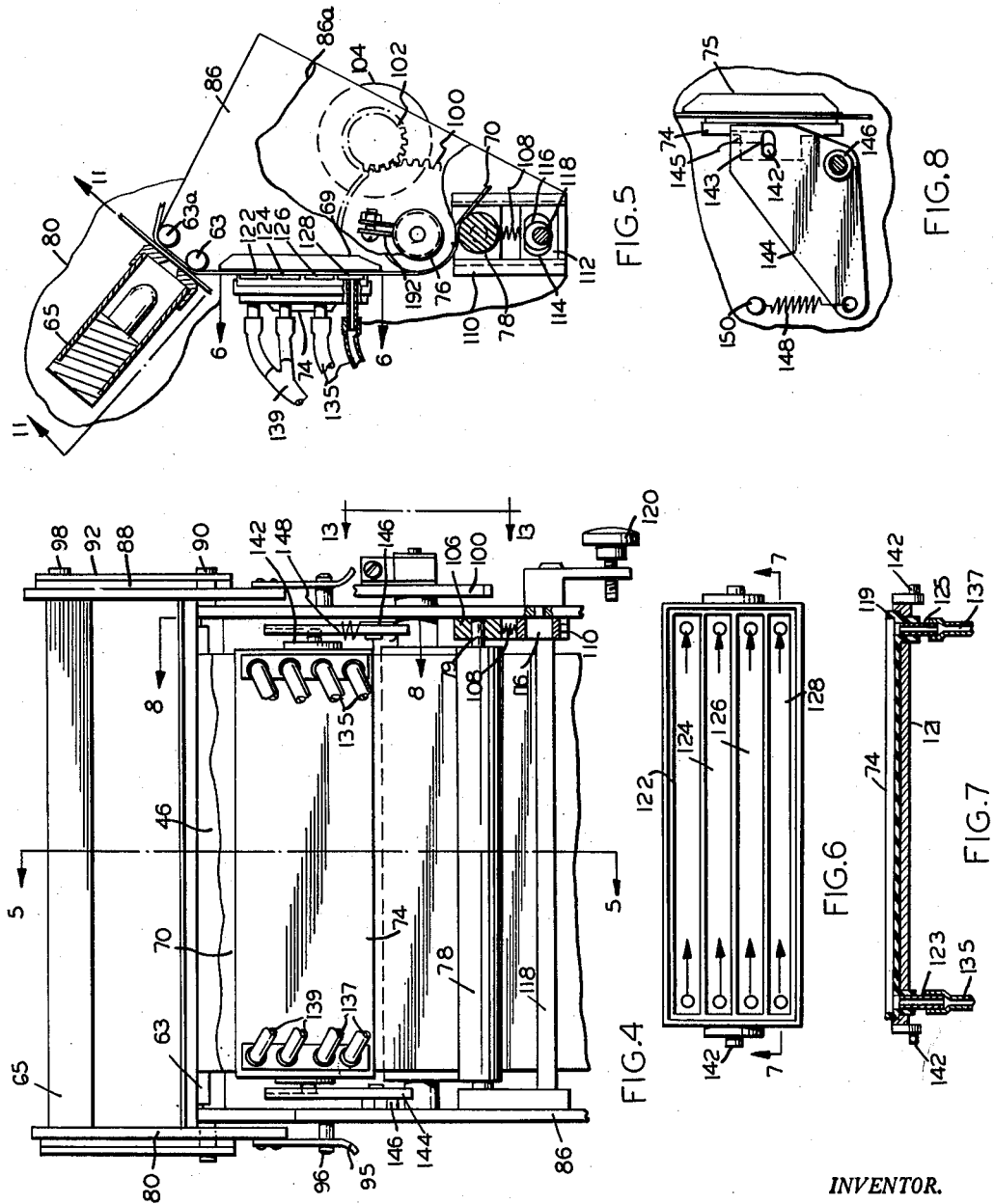

Aug. 11, 1964                   Z. TAKATS                   3,143,944
                        ULTRA-RAPID PROCESSING CAMERA
Filed Feb. 3, 1961                                      5 Sheets-Sheet 4

INVENTOR.
ZOLTAN TAKATS
BY
ATTORNEYS

Aug. 11, 1964  Z. TAKATS  3,143,944
ULTRA-RAPID PROCESSING CAMERA
Filed Feb. 3, 1961  5 Sheets—Sheet 5

INVENTOR.
ZOLTAN TAKATS
BY
ATTORNEYS

United States Patent Office 3,143,944
Patented Aug. 11, 1964

3,143,944
ULTRA-RAPID PROCESSING CAMERA
Zoltan Takats, Vestal, N.Y., assignor to General Aniline & Film Corporation, New York, N.Y., a corporation of Delaware
Filed Feb. 3, 1961, Ser. No. 86,968
4 Claims. (Cl. 95—14)

This invention relates to an improved camera having ultra-rapid self-contained film processing capability.

In the photographic arts, cameras adapted to process exposed film therein and produce positive prints are extremely desirable for a number of obvious reasons. To date, the known cameras capable of processing negative film and producing a positive print are primarily for amateur photographers, based on the diffusion transfer process and contain the processing solution in rupturable pores attached to laminated negative and print paper.

It is an object of this invention to provide a high quality camera, which combines the features of highly flexible studio or industrial equipment together with ultra-rapid self-contained processing capability utilizing continuous strip film which, after exposure, is processed within the unit.

It is also an object of this invention to provide an ultra-rapid self-contained processing unit which may be attached to a unique camera to provide an entire self-processing camera. The processor per se is adapted to process an exposed negative to produce an essentially dry photographic negative and to print on photographic paper from the negative as desired, all within the processor.

It is a further object of this invention to provide a compact structure for an ultra-rapid processing camera wherein the processor may be easily separated for access, for photographic paper loading, threading or inspection and repair as well as being extremely flexible in the usages of separate components in the processor, i.e., the negative processing and positvie printing, although interrelated within the unit, are capable of separation and independent operation.

Other objects and features will be apparent from the following description of the invention, pointed out in particularity in the appended claims and taken in connection with the accompanying drawing in which:

FIG. 1 is a side elevational view of the entire ultra-rapid processing camera and supports therefor constituting the preferred embodiment of this invention;

FIG. 2 is a front elevation of the camera and assembly of FIG. 1;

FIG. 4 is a top plan sectional view of the paper printing portion of the rapid process attachment taken along line 4—4 of FIG. 3;

FIG. 5 is a side sectional elevation view taken along line 5—5 of FIG. 4;

FIG. 6 is a view of a processing solution applicator taken along lines 6—6 of FIG. 5;

FIG. 7 is a sectional view through the processing solution applicator taken along lines 7—7 of FIG. 6;

FIG. 8 is a sectional view taken along lines 8—8 of FIG. 4 showing the mounting of the processing solution applicator;

Figure 3:
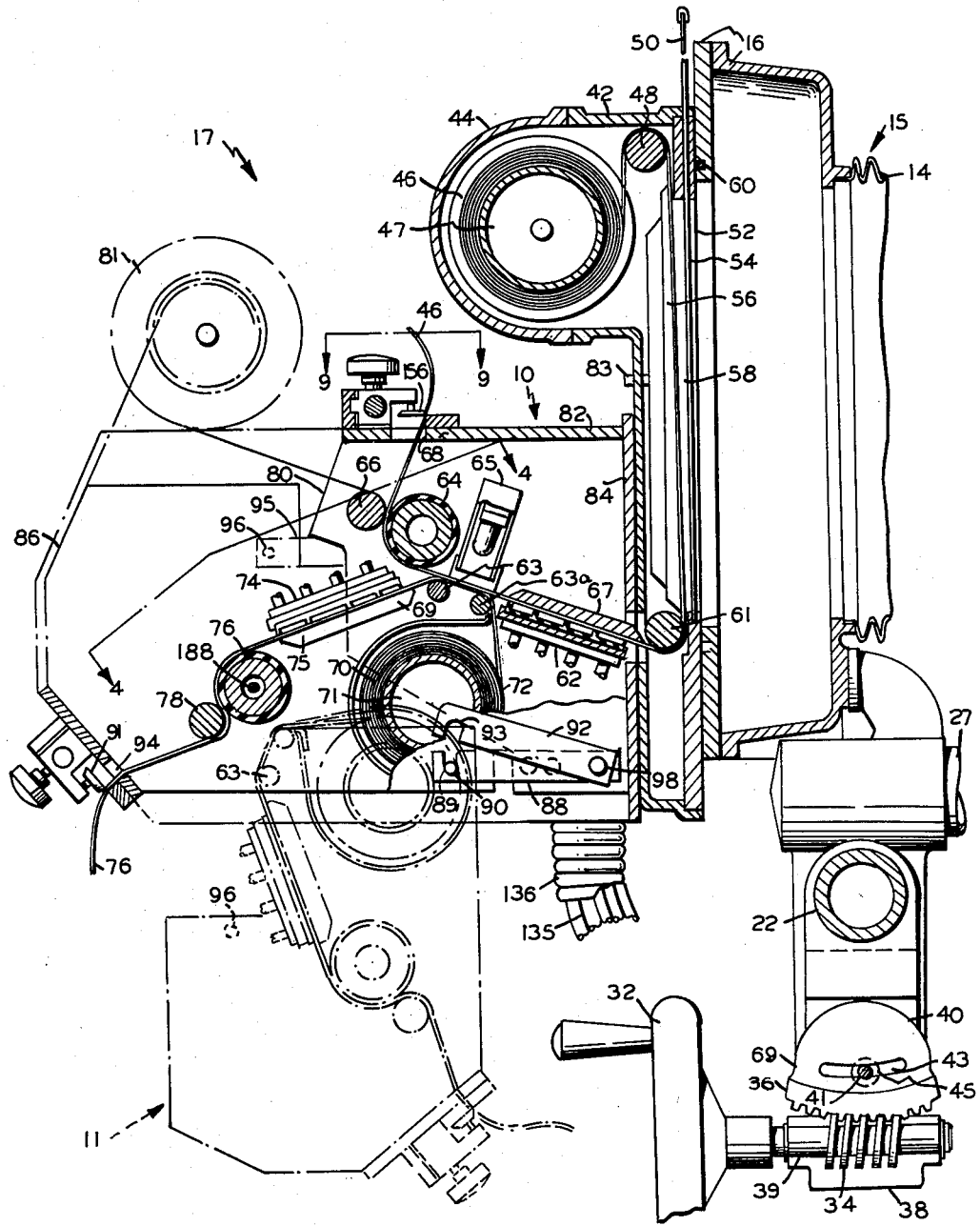
FIG. 3 is an enlarged sectional elevation view of a rapid processing attachment as applied to the camera with certain portions broken away for the sake of clarity.

Referring now to the drawings, FIGS. 1 and 2, it may be seen that the rapid processing camera of this invention includes a camera assembly 15 to which is attached a processor assembly 17. Both the camera assembly 15 and processor assembly 17 are supported from a support assembly 21.

The support assembly 21 includes a base pedestal 26 mounted on suitable casters 23 for bodily movement as desired. The base pedestal 26 supports a casing 33 enclosing processing solution containers and pumps as will be described hereinafter. A pair of vertical upright posts 18 and 20 are mounted on the base pedestal 26 and these posts carry a cross brace 22 slidably mounted therebetween in T connections 35.

The entire camera assembly 15 and processor assembly 17 are supported on cross brace 22. A counterweight arrangement is provided for vertical movement of the cross brace and supported camera. This counterweight consists of prestressed springs 24, 24' attached to the T connections 35 and to housings 49 at the top of posts 18 and 20. The counterweight arrangement facilitates raising and lowering the camera assembly 15 with the processor assembly 17 attached thereto.

For fixedly securing the camera assembly at a desired height, a pair of locking knobs 25 are provided on the slidable T connections 35. The T connections carrying camera supporting cross brace 22 may be locked to their associated posts 18 and 20 thereby preventing vertical movement of the camera from an adjusted position.

The camera assembly 15 and processing assembly 17 are supported as a unit from cross brace 22 and the camera assembly includes a forwardly extending monorail 27, FIGS. 1, 2 and 3. A forward-backward focusing motion may be obtained by moving the lens board 13 of the camera assembly 15 inwardly and outwardly on the monorail 27 while a tilting movement may be accomplished by tilting the entire camera assembly about cross brace 22.

Figure 16:
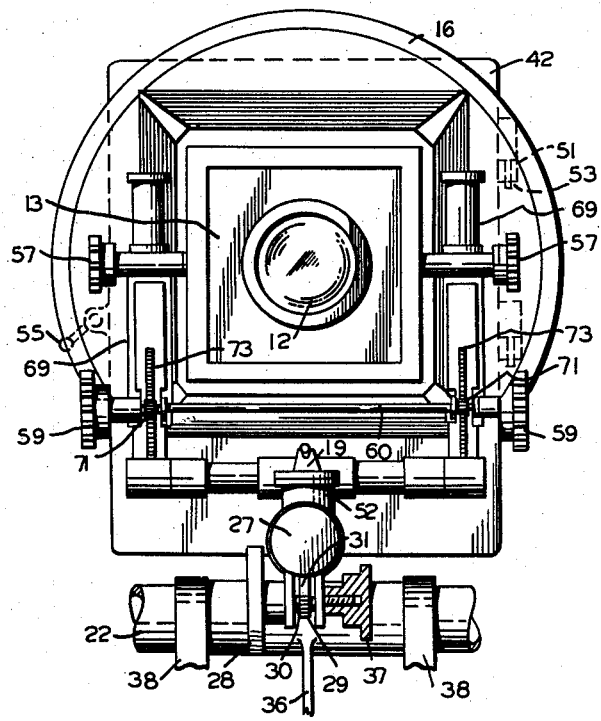
FIG. 16 is a front elevation view of the camera assembly per se illustrating its mounting arrangements.

The forward-backward focusing movement is provided by turning knob 28, which carries gear 29 on attached shaft 30, FIG. 16. Monorail 27 includes an integrally attached rack 31 meshing with gear 29. Thus, by turning knob 28, the lens board 13 in front portion of the camera assembly, slideably supported on a slide support 52, may move inwardly or outwardly with respect to the support assembly 21 and the film holding rear portion of the camera including camera housing casting 16. For locking the camera in focused position, a knob 37 is threaded onto the opposite end of shaft 30 and when screwed inwardly, binds the slide support 52 to freeze the movement of the front portion of the camera.

Angular motion of the camera assembly 15, including the monorail 28 about the axis of cross shaft 22, may be accomplished by rotating hand wheel 32, FIG. 3. Wheel 32 is mounted on a shaft 39 which is journaled within a split bracket 38. Integral with the shaft 39 within split bracket 38 is a worm 34 which is adapted to mesh with a gear sector 36 which, in turn, is integral with a bracket 69 rigidly attached to the camera assembly 15 and rotatable about cross shaft 22. It is thus evident that by turning wheel 32, worm 34 tilts gear sector 36 about its axis in the center of shaft 22 thus rotating the entire camera assembly 15 about the axis of this shaft. The rotational movement may be locked in any desired position by means of a knob 40 threadedly attached to a shaft 41 which passes through a slot 43 in gear sector 36 and has a friction washer 45 positioned thereon. By tightening knob 40, friction washer 45 bears against the edges of slot 43 in sector 36 thus locking the sector from movement by hand wheel 32.

The camera assembly 15 in addition to having the means for adjustably focusing the same, is further provided with additional camera features normally found in studio cameras; such as, lens board tilting. Referring to FIG. 16, the lens board 13 may be tilted about a horizontal axis (x) by means of opposite knobs 57, 57' attached to the lens board and journaled in vertical supports 69, which are, in turn, attached to the slide support 52 on monorail 27. The lens board 13 may be raised or lowered by means of knobs 59, 59' to which is attached a shaft 60 adapted to move the lens board assembly vertically by means of pinions 71 attached thereto and meshing with racks 73, 73' in the vertical supports 69, 69'. Lens board 13 may be further rotated about a vertical axis (y) manually after first loosening knob 19. After such rotation, the assembly is locked in place by tightening knob 19.

The camera assembly 15 includes a lens shutter 12 mounted on movable lens board 13 which, in turn, is connected by the usual bellows 14 to the camera housing casting 16. The casting 16 defines in the rear portion thereof, a focal plane for exposing suitable photographic film. It is to be noted that this camera, universally movable and tiltable on its support with the movable lens board for achieving desirable photographic effects, could be utilized to expose film contained at the focal plane therein in a more or less conventional manner or could be provided with the detachably connected hinged rapid processor assembly 17. If used conventionally, the rapid processor assembly 17 would be replaced with ground glass and/or a conventional film holder.

The rapid processing assembly 17 may be selectively connected to the camera assembly 15 by means of hinges. Two hinge barrels 51 are attached to camera housing casting 16 and hinge pins 53 attached to rapid processing attachment casting 42 are adapted to cooperate therewith for providing a hinged connection. The rapid processor assembly may be locked to the camera unit by a latch 55, FIG. 1, and may be removed by unloosening latch 55 and lifting hinge pins 53 vertically out of hinge barrels 51.

Referring now more specifically to FIG. 3, the rapid processor assembly 17 consists of two separate units. These units are a negative processing unit 10 and a positive print processing unit 11. The units may be utilized together to process and develop a negative and then print out from the negative onto photographic print paper and process the print or may be utilized separately as desired, since they may be separated. That is, the two units may be operated simultaneously for producing at the same time in successive order, a negative and a positive print thereof or the negative processing unit 10 may be operated separately to produce only negatives. Additional positive prints may be obtained by running an already developed negative through the positive paper printing unit. The units may be separated by swinging the positive print processing unit 11 downwardly about hinges to the dotted line position shown in FIG. 3.

As shown in FIG. 3, the rapid processing attachment casting 42 serves as a support for the processor assembly 17 and is provided with a light-tight cover 44 defining a light-tight chamber. The light-tight chamber is adapted to receive a roll of unexposed film 46 mounted on a reel 47. The film from the reel may be threaded out over a guide roller 48 and then vertically downward over a platen 56. Platen 56 is rigidly attached to casting 42 and supports the film 46 at the focal plane of the camera lens. The film path is defined by a channel which is formed by platen 56 and edge guide channel member 58. Since it is critical in certain cases that the film 46 be positioned flat against platen 56 the platen contains cross channels to which a source of vacuum is attached. The vacuum or negative pressure thereby holds the film flat against the surface of platen 56. A connection 83 is provided to a source of vacuum, not shown.

A slider 50 is slideably mounted in a groove 54 between camera housing casting 16 and film 46 so as to exclude light from the film. When the processor assembly 17 is separated from the camera 15, the slider 50 also functions as a light lock for the processor assembly 17. The slider 50 is slid out to allow exposure of film 46 under the control of the lens shutter 12. Also, other uses of the slider are apparent. For example, the slider 50 may be provided with an aperture smaller than the full size negatives, thus the slider shields unexposed portions from exposure. Alternatively, the slider may have an opening therein in the form of a very narrow slot or optical slit for a continuous line scan image presentation.

The film 46 after being exposed while held flat against platen 56, leaves the camera assembly 15 over a guide roller 61 and then passes between a rapid process applicator 62 and a corresponding backing platen 67. The surface of platen 67 is provided with a plastic lining having a low coefficient of friction such as "Teflon," thus providing a low frictional resistance to the moving film passing between applicator 62 and platen 67. A negative processing or developing fluid is applied to the emulsion side of the exposed film 46 from inside applicator 62 as will be described in detail hereinafter.

The film 46 is pulled through the negative processing unit 10 by a speed-controlled metering roller 64, which is a concentric rubber jacketed roller having a width equal to the full width of the film and the film 46 is held thereagainst by spring loaded pinch roller 66. The film is then fed through a slot 68 and out the slot past a cut-off knife 156 shown in detail in FIG. 9. Alternatively, a reel 81 may be provided for winding up the developed negative film. The process applicator 62 is similar to a process applicator 74 shown in detail in FIGS. 6 and 7 while the metering roller 64 and pinch roller 66 are similar in detail to metering roller 76 and pinch roller 78 shown in detail in FIGS. 4 and 5, to be described hereinafter.

All the components of the negative processing unit 10 are mounted between two similar vertical side plates 80, which together with top plate 82 and front plate 84, form a box-like structural support frame for the negative processing unit 10.

The positive print processing unit 11 includes a roll of unexposed photoprint paper 70 contained on a reel 71 and located within a light-tight magazine 72. The photoprint paper 70 is fed out of the light-tight magazine 72 over rollers 63, 63' while in contact with the film 46 under a printing lamp assembly 65. Thus, the developed image on the negative film 46 may be exposed on the photoprint paper 70 as is well known in the art.

After printing, the photoprint paper 70 passes to a process applicator 74 backed by a platen 75 where a suitable processing solution is applied to the sensitized surface of the photoprint paper. The print paper 70 is fed by a driven metering roller 76 and is held tightly thereagainst by a spring loaded pinch roller 78. The final print paper then passes through slot 94 past a cut-off knife assembly 91, which is identical in structure with cut-off knife 156 shown in detail in FIG. 9.

All of the components of the processing unit 10 are supported between two vertical side plates 86, which together with a connecting plate, form a frame for the positive print unit 11. As shown in FIG. 3, the print unit 11 may be swung downwardly to the dotted line position. The positive print unit 11 is attached to the negative processing unit 10 by means of two pins 90 protruding from side plates 86 of unit 11. Unit 10 has a pair of arms 88 rigidly secured thereto provided with notches 89 to accept pins 90 to form a hinge so that unit 11 may be swung away from the full line position to the dotted line position as shown in FIG. 3. Two additional arms 92, with a notch 93, reversed from notch 89, are pivotally mounted on a stud 98 and utilized to hold pins 90 in notch 89. When pivoted about pins 90 to the full line position of FIG. 3, the print unit 11 may be locked in operative position by engaging pins 96 extending from the sides of plates 86, FIG. 4, with spring latches 95 having holes therein to receive the pins 96, the spring latches being fixed to plates 80 of unit 10.

It may be seen that both the negative processing unit 10 and positive print processing unit 11 include a process applicator and backing platen, a metering roller and pinch roll, and a cut-off knife. These assemblies are substantially identical for each unit and only one of each will be described. The metering roll and pinch roll as well as the process applicator and backing platen are illustrated in FIG. 4 and the sectional views taken therefrom.

FIG. 4 is a sectional view taken along lines 4—4 of FIG. 3 with metering roller 64 and pinch roller 66 omitted for the sake of clarity. The spring loading mechanism for the pinch roller and for removing the pinch roller bias for print paper threading is illustrated in FIGS. 4 and 5. Pinch roller 78 has extending stub shafts 79 which are mounted in slide blocks 106 at each end of the roller. Each block 106 is free to slide in grooved channels of a mounting block 110, FIG. 5. Another block 112 is slideably mounted in slotted block 110 and contains therein an elongated slot 114. A shaft 118 carries a pair of cams 116 which cooperate with the slot 114 in block 112. The shaft 118 is journaled about a fixed axis through side plates 86, 86', and includes an operating handle 120 on one end thereof. It can thus be seen that by rotating handle 120, cam 116 rotates within slot 114, moving block 112 and therefor moving the lower end of a spring 108 which, in turn, biases roller 78 carried in slideable block 106 against the surface of metering roller 76. The FIG. 5 position shows the spring 108 compressed by the high side of cam 116 according to the position of shaft 118. For threading the paper 70 through the apparatus, the low position of the cam would release the bias of the spring and allow the block 106 to move away from the surface of the roller 76 or at least not be biased thereagainst with full pressure so that the paper 70 may be threaded therebetween.

FIGS. 6, 7 and 8 show the processing solution applicator and its mounting. Applicator 74, as mentioned above, is identical with applicator 62. The applicator includes a supporting base pan 121 having extending stub shafts 142, 142' on both ends thereof. Mounted within the pan is a plastic tray 119 with a number of longitudinal dividers defining separated channels 122, 124, 126 and 128. The tray may be constructed from a plastic having a low coefficient of friction, such as material marketed under the name "Teflon" or the like. At each end of each channel in the tray, there is an opening provided with a tubular connection. Openings and tubular connections 123 constitute the inlets for each channel while openings and connections 125 constitute the outlets. It may thus be seen that within each channel 122, 124, 126 and 128 the processing solution supplied through openings 123 will flow from left to right (as viewed in FIG. 6) out the outlet openings 125. Flexible piping or tubing including the inlet tubing 135 and outlet tubing 137 for each channel is provided. The solution is thus applied in parallel directly to the required side of the print paper, or in the case of applicator 62, to the emulsion side of the negative. The channel dividers effectively form a squeegee action so that substantially no fluid flows from one channel to another.

The process applicator 74 is mounted adjacent backing platen 75 as shown in FIG. 8 about a pivotal connection defined by the extending stub 142, 142', which is mounted in slots 143 in side plates 144. In addition to slot 143, a channel 145 is provided in each side plate for insertion and removal of the stub shafts 142 and hence insertion and removal of applicator 74 from its position mounted on side plates 144, 144'. Side plates 144, 144' are pivotally mounted on stub shafts 146 which, in turn, are secured to the plates 86, 86'. A spring 148 attached to each plate 144 and to an anchor pin 150 is provided to bias the applicator 174 against the platen 75 with the desired degree of pressure.

Figure 9:
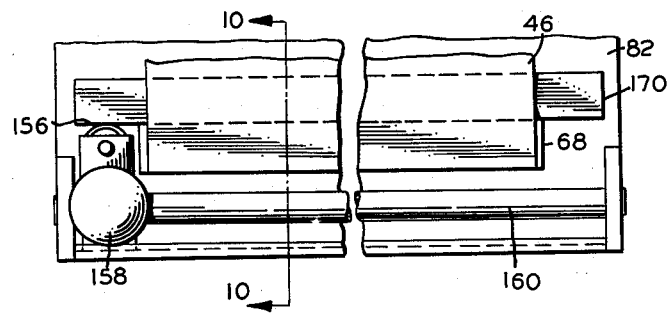
FIG. 9 is an enlarged plan view of a cut-off knife utilized in the processor unit taken along lines 9—9 of FIG. 3.
Figure 10:
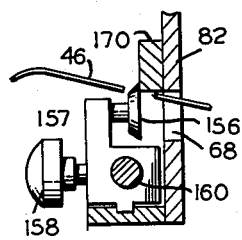
FIG. 10 is a sectional view along lines 10—10 of FIG. 9 illustrating the cut-off knife in section.

The cut-off knife assembly is shown in detail in FIGS. 9 and 10. The cut-off knife assembly of FIGS. 9 and 10 is identical with the cut-off knife assembly 91 shown in FIG. 3 for the print unit 11. The cut-off knife assembly includes a rotatable hollow ground sharp knife roller 156, which is held under pressure against an elongated shear strip 170. The knife 156 is rotatably mounted on a support 157, which in turn is movable across the width of film 46 along a rod 160. The movement may be under the control of a hand knob 158.

Figure 11:
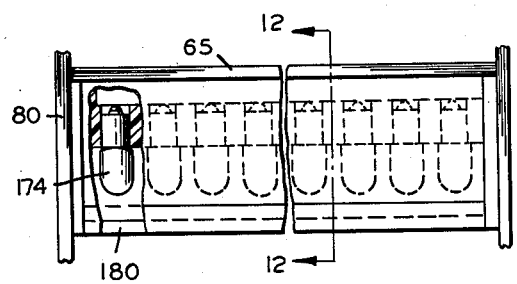
FIG. 11 is a sectional elevation view taken along lines 11—11 of FIG. 5 illustrating a printing lamp assembly utilized in the print processor.
Figure 12:
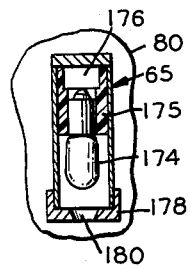
FIG. 12 is a sectional view of the printing lamp assembly taken along lines 12—12 of FIG. 11.

The printing lamp assembly 65 is shown in detail in FIGS. 11 and 12. It includes a plurality of lamps 174 mounted in a support 175 in contact with a bus bar 176 for supplying electrical energy thereto. The illumination provided by lamps 174 passes through a continuous slot 180 in a lamp housing 179. The bottom of the lamp housing 178 is positioned in close contact with the negative 46 and the print paper 70 held against the back side thereof by roller 63, 63', as shown in FIGS. 3 and 5. The intensity of the illumination provided by the lamps 174 may be controlled by controlling the power supplied to the bus bar 176 by means of a rheostat or the like (not shown).

Figure 14:
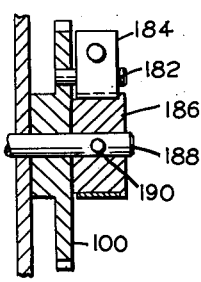
FIG. 14 is a sectional elevational view taken along lines 14—14 of FIG. 13.
Figure 13:
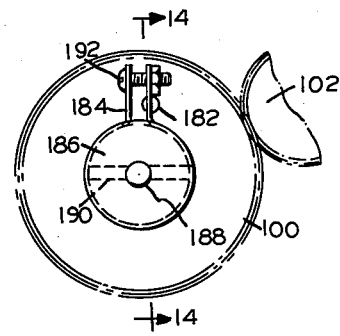
FIG. 13 is an end elevation view of a metering roller drive gear and clutch mechanism taken along lines 13—13 of FIG. 4.

Each metering roller, 64 and 76, has its own drive motor. Since these motors may not be synchronous and may be turning at a slightly different speed, a clutch mechanism is provided on the drive motor driving metering roll 76 to permit the print paper 70 and negative 46 to travel at an identical rate. This clutch mechanism is shown in FIGS. 5, 13 and 14. A drive motor 104 for metering roll 76 has a drive pinion 102 attached to the drive shaft thereof and this pinion is in mesh with a drive gear 100 freely rotatable on a shaft 188. Shaft 188, in turn, is rigidly fixed to the metering roller 76. The clutch mechanism includes a slotted pin 182 protruding from the face of gear 100 and a clutch band 184 wrapped around a drum 186, the drum being attached to shaft 188 by pin 190. The clutch band 184 extends into the slot of slotted pin 182 so that the drive of gear 100 causes movement of the clutch band 184 and corresponding movement of drum 186 in shaft 188, depending upon the amount of slip caused by the friction of clutch band 184 around the periphery of drum 186. Any degree of friction may be obtained by adjusting screw 192 thus tightening band 184 on drum 186.

Figure 15:
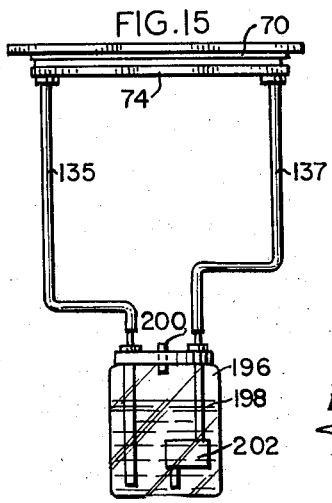
FIG. 15 is a schematic diagram of the processing solution circulating system.

The solution circulatory system for supplying processing solution to the applicators 64 and 74 is illustrated schematically in FIG. 15, which shows one supply tube 135 and one return tube 137 for the process applicator 74 backed by platen 75 with print paper 70 therebetween. The fluid flow may also be considered in connection with FIGS. 6 and 7 showing the various channels within the process applicator 74. The solution 198 in container 196 is under normal atmospheric pressure as container 196 is vented by vent pipe 200 to ambient. A positive displacement pump 202 pulls the solution from return line 137 and since the entire solution 198 is under atmospheric pressure with pump 202 operating the solution will rise in supply line 135.

The solution supply pipes 135 may be contained within larger tubular conduits 136 as shown in FIGS. 1 and 3. Also, the solution containers 196 with associated pumps 202 may, if desired, be positioned underneath casing 33 on the base pedestal 26, FIG. 1.

In operation, film 46 on reel 47 may be loaded into the camera by removing light-tight cover 44. The film is threaded over rollers 48 and 61 and between process applicator 62 and platen 67 as process applicator 62 is swung away from platen 67 in a manner similar to that described for process applicator 74. The film is then passed between metering roller 64 and pinch roller 66 with pinch roller 66 moved away from metering roller 64 in a manner similar to that described for metering rollers 76 and 78. The film is then passed on up to slot 68. A roll of positive print paper 70 is loaded into light-tight chamber 72 and threaded over rollers 63 and between applicator 74 and backing platen 75 with applicator 74 swung out of the way and then between metering roll 76 and pinch roll 78 with pinch roll 78 moved out of the way and subsequently through slot 94 to cutter assembly cut-off knife unit 91. Print paper threading may be accomplished with the print processing unit 11 in its downward position shown in dotted lines in FIG. 3. Then for printing and developing simultaneously, the print unit 11 is moved upwardly about its hinge pin 90 and locked by latch 95 or pin 96 in the full line position of FIG. 3.

The camera assembly 15 may be adjusted by the various adjustments, including the focus adjustment by knob 28, the tilting adjustment controlled by hand wheel 32 and the vertical up and down movement controlled by locking hand knobs 25. The lens board 13, in addition, may be tilted about the *x* and *y* axis as shown in FIG. 16 by means of knobs 57 and 19, and, in addition, may be raised or lowered by means of knobs 59. After all of these adjustments are made and it is desired to expose the film and develop the same, the slide 50 may be moved and the film exposed and then the drive motors for driving the film energized to move the film out of the camera. The pumps 202 of the solution containers 196 are energized to supply solution to the applicator 62, which develops the exposed film 46 and provides a substantially dry film as it leaves the applicator 62 after which the developed film is moved into contact with the sensitized print paper 70 under lamp assembly 65 and the paper 70 is printed from the developed negative image on the film while subsequently, the negative film is driven upwardly by metering roller 64, out slot 68, and may be cut off by knife 156. The exposed print paper is processed by solution, applied by process applicator 74, and is driven outwardly at the same speed as the film 46 by means of clutch controlled metering roller 76 and passes out slot 94 for being cut in required lengths by cutter unit 91.

The film and positive print unit may be driven intermittently after each exposure to produce conventional negative and prints, or may be driven continuously to produce time lapse type negative and positive prints. Alternatively, as an example of the flexibility of the camera, by using an electronic flash gun with an extreme short duration of light flash, a picture can be frozen on a portion of the unexposed film 46 without stopping a continuously moving film web. Further, by continuously running film 46, the camera can record scan line images producing a continuous recorded image on the film. Also, by the use of various types slides 50, further flexibility can be achieved.

It is thus seen that the camera has great applicability where a stationary or moving film web is desired to produce a high quality photographic image and to process prints and negatives therefrom selectively as desired.

While there have been shown and described and pointed out the fundamental novel features of the invention as applied to the disclosed preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a rapid processing camera for producing developed negatives and positive photographic prints comprising, a support assembly, a camera assembly adjustably supported on said support assembly with a plurality of adjustments, a rapid processing assembly adapted to be detachably secured to the camera assembly to provide a single integral unit, the rapid processing assembly including a film web supply, an applicator for applying solution to develop said film web after exposure by said camera assembly, a photoprint paper supply, a printing lamp assembly directed to expose the developed image on the negative film web to the positive print paper, a positive print procesing applicator, and means for driving both the positive print paper and negative web through the processor assembly, said processing attachment being divided into two separable hinged units, a negative web processing unit including the process applicator, the printing lamp means, the metered drive means and cut-off means for the negative web and a positive print processing unit including the print paper supply, the process applicator, the metered drive means and the cut-off means for the print paper, means hingedly connecting the two units together and means latching said units in position to simultaneously process the negative web and produce positive processed prints therefrom.

2. A rapid processing attachment as defined in claim 1 further comprising clutch means in the metered drive means for the print paper.

3. A rapid processing attachment as defined in claim 1 wherein each said metered drive means comprises a friction surfaced driven roll, a spring loaded pinch roll biased against the driven roll, and means to release the bias on said pinch roll for web threading.

4. A rapid processing attachment as defined in claim 1 wherein each said processing applicator is pivotally mounted for web threading and comprises a tray divided into a number of parallel channels extending transversely across the web being processed, tubular means connected to each end of each channel for supplying processing solution separately to each of said channels and withdrawing said solution from each of said channels, and further comprising a processing solution supply vented to atmosphere connected to said tubular means, a pump means connected in circuit with said processing solution supply and the tubular means connected to the channels.

References Cited in the file of this patent
UNITED STATES PATENTS

| | | |
|---|---|---|
| 1,682,931 | Pifer | Sept. 4, 1928 |
| 2,552,251 | Bornemann | May 8, 1951 |
| 2,677,305 | Oswald | May 4, 1954 |
| 2,784,653 | Pierce | Mar. 12, 1957 |
| 2,932,478 | Krieger | Apr. 12, 1960 |
| 3,060,829 | Leighton | Oct. 30, 1962 |